(12) United States Patent
Ueno

(10) Patent No.: US 9,211,905 B2
(45) Date of Patent: Dec. 15, 2015

(54) STEERING APPARATUS

(71) Applicant: Seiji Ueno, Gunma-ken (JP)

(72) Inventor: Seiji Ueno, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/233,380

(22) PCT Filed: Oct. 1, 2012

(86) PCT No.: PCT/JP2012/075348
§ 371 (c)(1),
(2) Date: Jan. 16, 2014

(87) PCT Pub. No.: WO2013/084568
PCT Pub. Date: Jun. 13, 2013

(65) Prior Publication Data
US 2015/0041240 A1 Feb. 12, 2015

(30) Foreign Application Priority Data

Dec. 5, 2011 (JP) ................................ 2011-265422

(51) Int. Cl.
B62D 3/12 (2006.01)
F16H 57/028 (2012.01)
(Continued)

(52) U.S. Cl.
CPC ................ B62D 3/12 (2013.01); B62D 5/0409 (2013.01); F16H 57/028 (2013.01); *F16H 19/04* (2013.01); *F16H 55/283* (2013.01); *F16H 57/021* (2013.01)

(58) Field of Classification Search
CPC ................................ B62D 3/12; B62D 5/0409
USPC ....... 180/443, 444; 74/388 PS, 425; 384/498, 384/518
See application file for complete search history.

(56) References Cited

U.S. PATENT DOCUMENTS 4,224,833 A * 9/1980 Jablonsky ....................... 74/422
2005/0257634 A1 11/2005 Someya et al.
(Continued)

FOREIGN PATENT DOCUMENTS

JP 55-132449 U 9/1980
JP 19790031285 U * 9/1980
(Continued)

OTHER PUBLICATIONS

English translation of International Preliminary Report on Patentability from International Patent Application No. PCT/JP2012/075348, mailed Jun. 19, 2014.
(Continued)

*Primary Examiner* — Joseph Rocca
*Assistant Examiner* — Jacob Knutson
(74) *Attorney, Agent, or Firm* — Miles & Stockbridge P.C.

(57) ABSTRACT

A steering apparatus has a pinion shaft that transmits rotation of a steering wheel to a rack shaft, a bearing that is internally fitted to the housing, rotatably supports one end of the pinion shaft on the housing, and bears a radial load and a thrust load acting on the pinion shaft, and a retaining ring that is internally fitted to an annular groove provided on the inner circumferential surface of the housing and has a C-shaped part and an opening defined by two opposed ends of the C-shaped part, the C-shaped part being in contact with an end face of an outer ring of the bearing to thereby fix the outer ring of the bearing to the housing. The retaining ring is internally fitted to the annular groove in such a way that the opening faces toward the rack teeth as seen from an axial direction of the pinion shaft.

6 Claims, 5 Drawing Sheets

(51) Int. Cl.
*B62D 5/04* (2006.01)
*F16H 19/04* (2006.01)
*F16H 55/28* (2006.01)
*F16H 57/021* (2012.01)

(56) References Cited

U.S. PATENT DOCUMENTS

2005/0257991 A1* 11/2005 Ishii et al. .................... 180/444
2006/0162989 A1* 7/2006 Yamada ....................... 180/444
2009/0255751 A1* 10/2009 Kondo et al. ................ 180/444

FOREIGN PATENT DOCUMENTS

JP 58-008670 U 1/1983
JP 2010-038254 A 2/2010

OTHER PUBLICATIONS

English Translation of Office Action issued Jan. 14, 2015, in Chinese Patent Application No. 201280001705.4.

* cited by examiner

STEERING APPARATUS

TECHNICAL FIELD

The present invention relates to a steering apparatus, in particular, a rack-and-pinion type steering apparatus adapted to prevent abnormal noise from being generated when a gap is created between an outer ring of a bearing fixed by a tapered snap ring and a housing by a load exerted on a pinion shaft.

BACKGROUND ART

In rack-and-pinion type steering apparatuses, rack shaft that changes the turning angle of wheels via a tie rod is supported on the housing of the steering gear assembly in such a way as to be able to move back and forth, and a pinion shaft that transmits the rotation of the steering wheel to the rack shaft is rotatably supported on the housing by a bearing.

In such rack-and-pinion type steering apparatus, the pinion shaft may move in the radial direction or in the thrust direction due to a load exerted on the pinion shaft upon steering operation, whereby abnormal noise is generated or the steering force is varied. In view of this, the bearing with which the pinion shaft is rotatably supported is fixed to the housing thereby fixing the pinion shaft with respect to the radial direction and the thrust direction to prevent the generation of abnormal noise and the variation in the steering force.

Fixing the bearing by a ring nut is preferred in increasing the rigidity of the bearing with respect to the radial direction and the thrust direction. However, this leads to the problem of increase in the size of the steering gear assembly, because a space for accommodating the ring nut is needed.

Preloading the bearing with a tapered snap ring serving as a fastening ring leads to low cost and light weight and allows reduction in the size of the steering gear assembly because the space for accommodating the tapered snap ring may be small. However, fixing the bearing by a tapered snap ring leads to low rigidity of the bearing with respect to the radial direction and the thrust direction.

Consequently, a load exerted on the pinion shaft upon steering will press the tapered snap ring up in the axial direction or tilt it, whereby the pinion shaft will shift in the thrust direction to create a gap between the outer ring of the bearing and the housing. Then, the position of engagement of the pinion and the rack is displaced from the correct position, causing abnormal noise like slapping noise.

In a rack-and-pinion type steering apparatus disclosed in Japanese Patent Application Laid-Open No. 2010-038254, a plurality of conical projections are provided on a slanted surface of the tapered snap ring at regular intervals. In addition, an annular recessed groove is provided on the slanted surface of an annular groove, which is provided on the inner circumferential surface of the housing and in which the tapered snap ring is fitted. Thus, when an external force acts on the tapered snap ring in the axial direction to reduce the diameter of the tapered snap ring by a predetermined amount, the projections on the tapered snap ring comes into engagement with the inner wall of the annular recessed groove. This prevents the diameter of the tapered snap ring from decreasing more than the predetermined amount and restricts the displacement of the tapered snap ring in the axial direction. However, the rack-and-pinion type steering apparatus disclosed in Japanese Patent Application Laid-Open No. 2010-038254 is complex in the shapes of the tapered snap ring and the annular groove. This leads to the problems of difficult machining and increased manufacturing cost.

PRIOR ART DOCUMENT

Patent Document: Japanese Patent Application Laid-Open No. 2010-038254

SUMMARY OF THE INVENTION

Problem to be Solved by the Invention

An object of the present invention is to provide a rack-and-pinion type steering apparatus in which abnormal noise that might be caused when the position of engagement of a pinion and rack teeth is displaced due to a load acting on the pinion shaft is prevented from occurring without an increase in the manufacturing cost.

Means for Solving the Problem

The above-described object can be achieved by the following means. According to the present invention, there is provided a steering apparatus comprising a housing; a rack shaft that is supported on the aforementioned housing in such a way as to be able to move back and forth and changes the turning angle of a wheel via a tie rod; a pinion shaft that is linked with a steering wheel, has a pinion engaging with rack teeth of the aforementioned rack shaft, and transmits rotation of the steering wheel to the aforementioned rack shaft; a first bearing that is internally fitted to the aforementioned housing, rotatably supports one end of the aforementioned pinion shaft on the housing, and bears a radial load and a thrust load acting on the aforementioned pinion shaft; a second bearing that is internally fitted to the aforementioned housing, rotatably supports the other end of the aforementioned pinion shaft on the housing, and bears a radial load acting on the aforementioned pinion shaft; and a retaining ring that is internally fitted to an annular groove provided on an inner circumferential surface of the aforementioned housing and has a C-shaped part and an opening defined by two opposed ends of the C-shaped part, the aforementioned C-shaped part being in contact with an end face of an outer ring of the aforementioned first bearing to thereby fix the outer ring of the first bearing to the aforementioned housing, wherein the aforementioned retaining ring is internally fitted to the annular groove of the aforementioned housing in such a way that the aforementioned opening faces toward the aforementioned rack teeth as seen from an axial direction of the aforementioned pinion shaft.

In a preferred mode of the steering apparatus according to the present invention, as seen from the axial direction of the aforementioned pinion shaft, let $\theta$ be the angle of the aforementioned opening relative to a center axis that is parallel to the axis of the aforementioned rack shaft and passes the center of the aforementioned pinion, and let $\alpha$ be a pressure angle of the aforementioned rack teeth; then the range of the aforementioned angle $\theta$ is an angle range that is on the rack shaft side among angle ranges delimited by two directions that are inclined respectively from one and the other directions of the aforementioned center axis by angle $\alpha$ about the center of the pinion toward the rack shaft.

Advantageous Effects of the Invention

According to the present invention, even when a large moment M acts on the retaining ring by a load exerted on the pinion shaft, tilting of the retaining ring relative to the pinion shaft and displacement of the pinion shaft in the axial direction can be prevented from occurring. In consequence, the position of engagement of the pinion and the rack teeth can be maintained at an appropriate position, and therefore generation of abnormal noise and variation in the steering force can be prevented.

MODE FOR CARRYING OUT THE INVENTION

Figure 1:
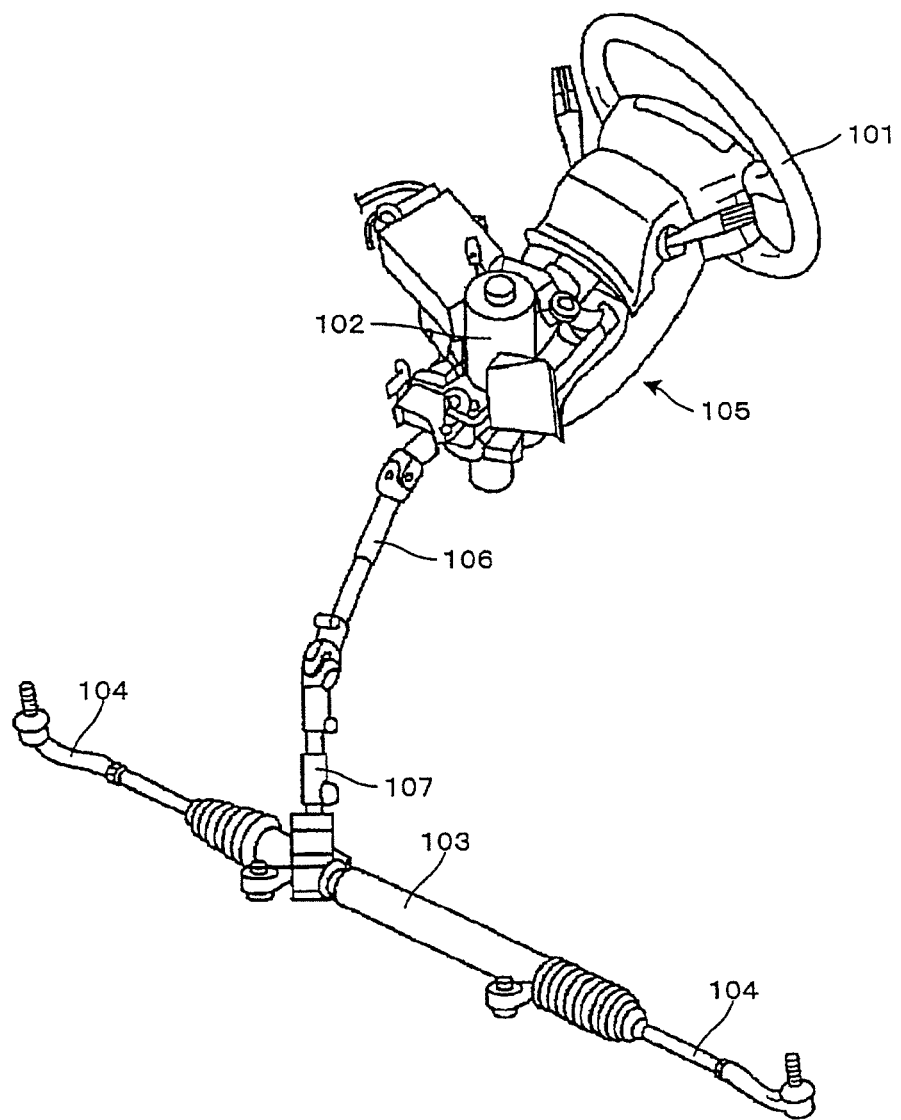
FIG. 1 is an overall perspective view of a column-assist, rack-and-pinion type steering apparatus according to an embodiment of the present invention.

FIG. 1 is an overall perspective view of a column-assist, rack-and-pinion type power steering apparatus according to an embodiment of the present invention. As shown in FIG. 1, the column-assist, rack-and-pinion type power steering apparatus according to the embodiment of the present invention applies a steering assist force generated by a motor 102 attached to a middle portion of a steering column 105 to a steering shaft in order to lighten the hand effort in operating the steering wheel 101. The rotation of the steering shaft is transmitted to an intermediate shaft 106 to move a rack shaft of a rack-and-pinion type steering gear assembly 103 back and forth via a pinion shaft 107, thereby turning the steer wheels via tie rods 104.

Figure 2:
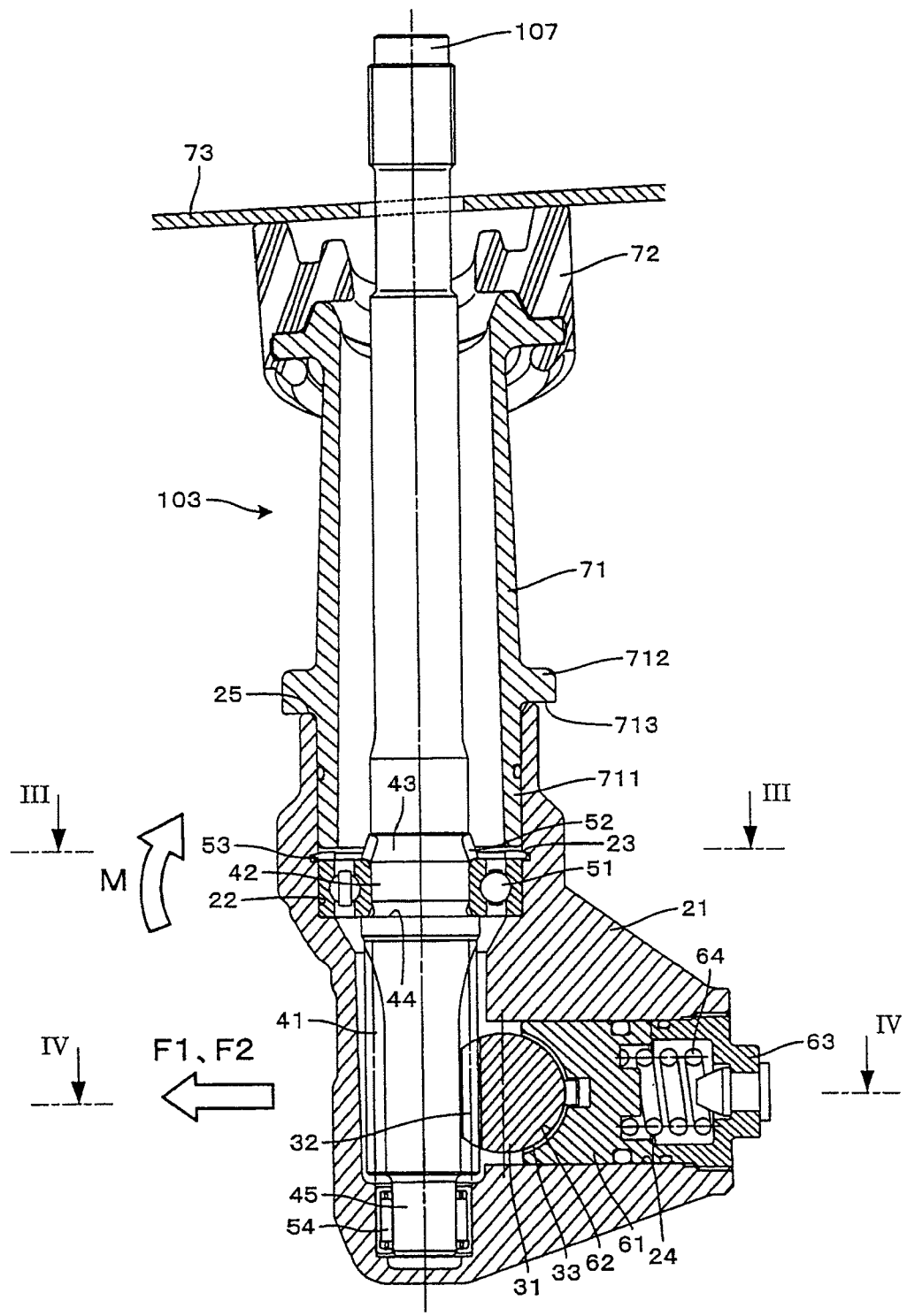
FIG. 2 is a longitudinal cross sectional view showing a portion of engagement of a rack and a pinion of a steering gear according to the embodiment of the present invention.
Figure 3:
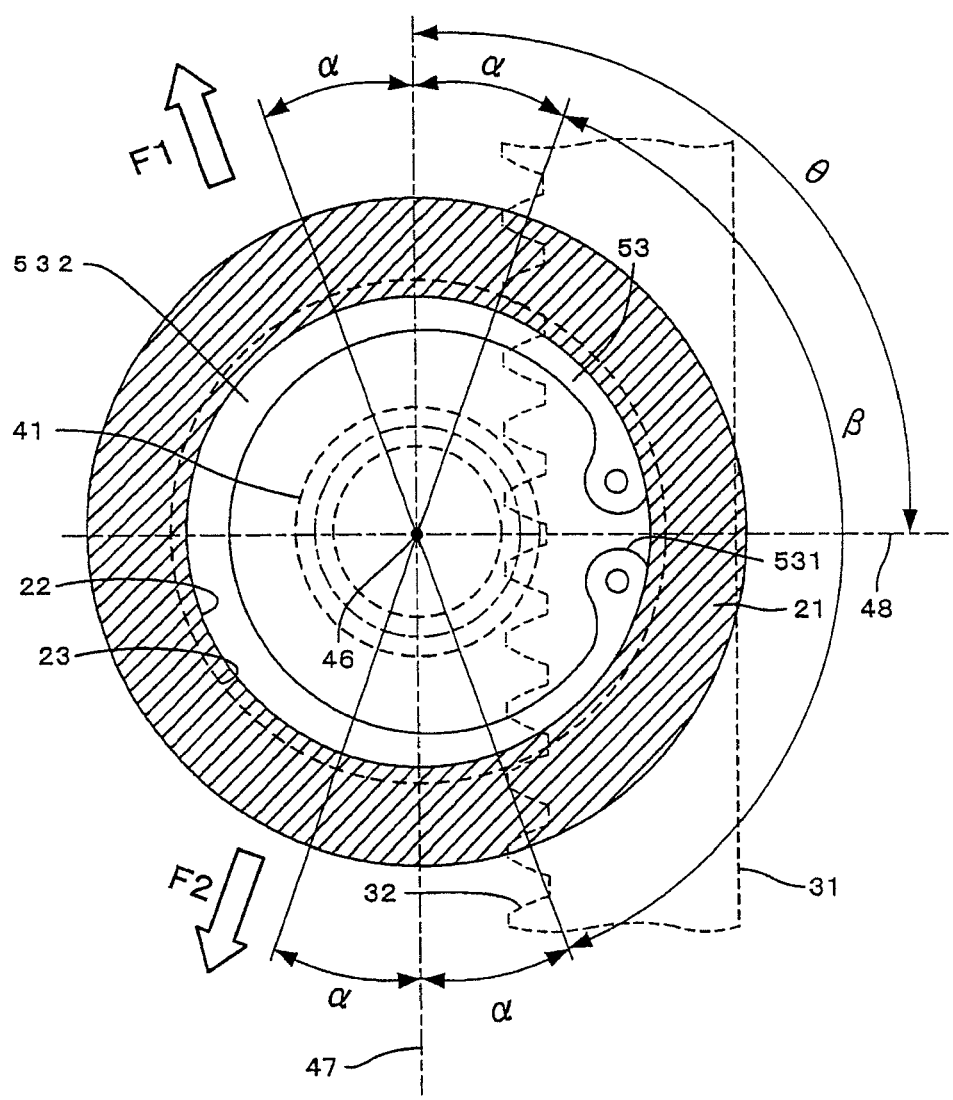
FIG. 3 is a cross sectional view taken on line of FIG. 2.
Figure 4:
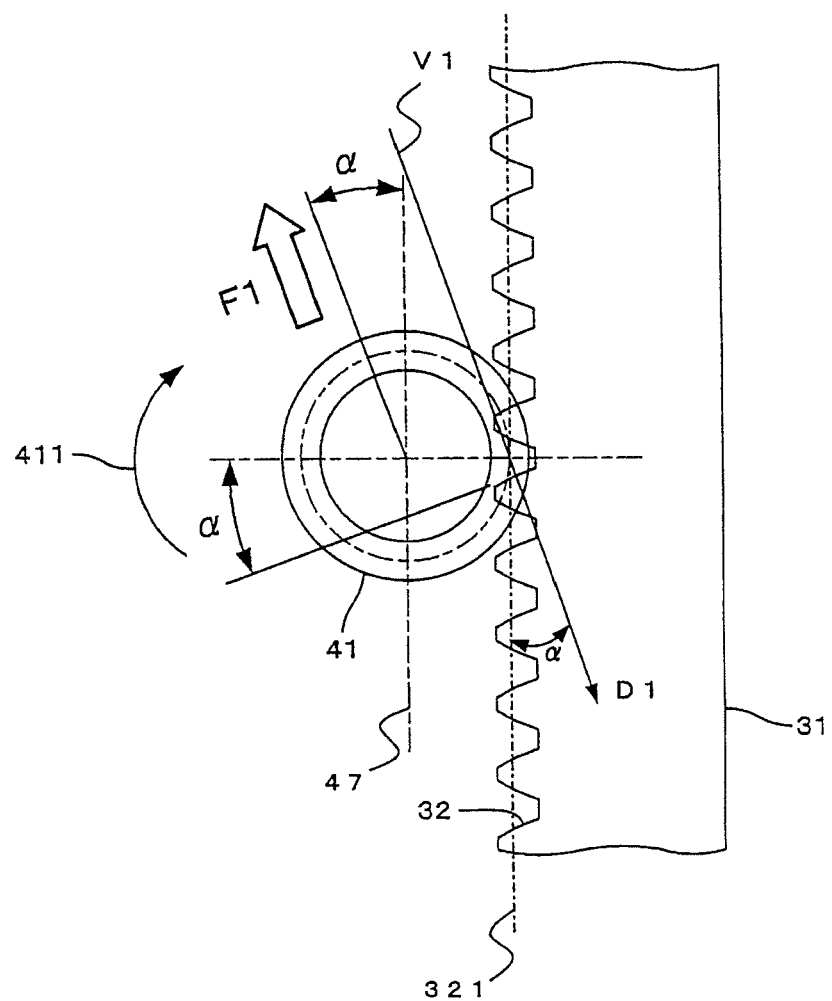
FIG. 4 is a cross sectional view taken on line IV-IV of FIG. 2, illustrating a load acting on the tooth surface in the portion of engagement of rack teeth and the pinion rotating in the clockwise direction.
Figure 5:
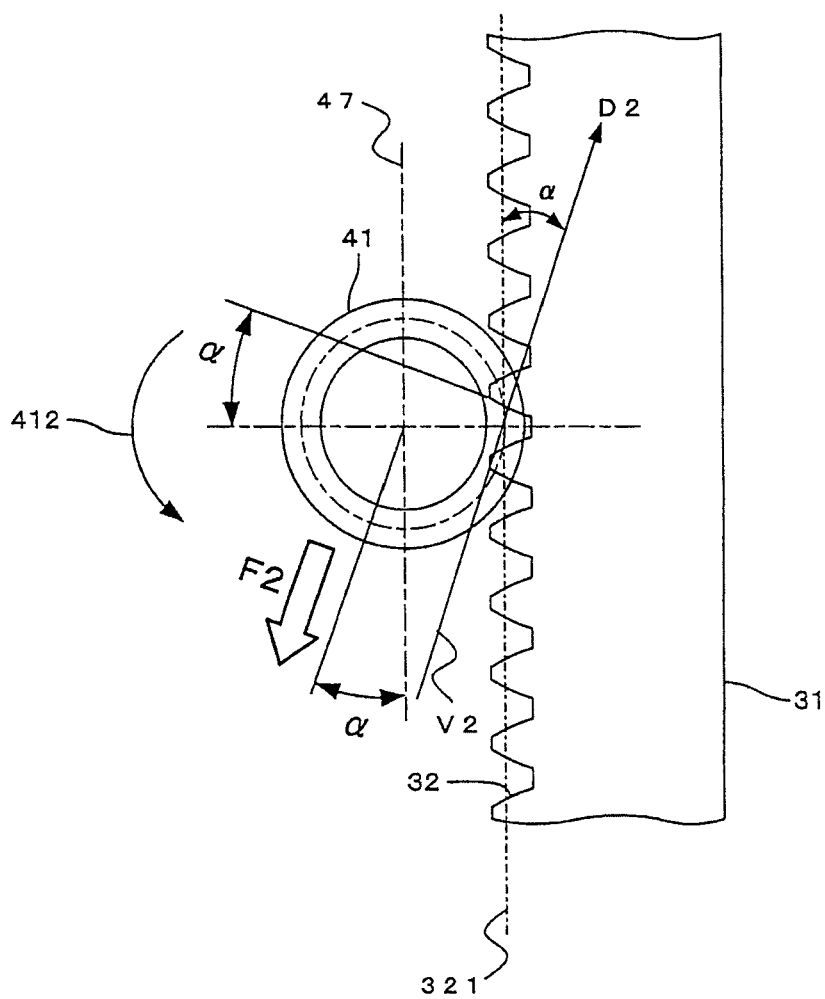
FIG. 5 is a cross sectional view taken on line IV-IV of FIG. 2, illustrating a load acting on the tooth surface in the portion of engagement of the rack teeth and the pinion rotating in the anticlockwise direction.

FIG. 2 is a longitudinal cross sectional view showing the portion of engagement of the rack and the pinion in a steering gear according to the embodiment of the present invention. FIG. 3 is a cross sectional view taken on line of FIG. 2. FIG. 4 is a cross sectional view taken on line IV-IV of FIG. 2, illustrating a load acting on the tooth surface in the portion of engagement of rack teeth and the pinion rotating in the clockwise direction. FIG. 5 is a cross sectional view taken on line IV-IV of FIG. 2, illustrating a load acting on the tooth surface in the portion of engagement of the rack teeth and the pinion rotating in the anticlockwise direction.

The steering gear assembly 103 according to the embodiment of the present invention is mounted on a frame of a vehicle body such as a front sub-frame, which is not shown in the drawings. A rack shaft 31 is internally fitted in the housing 21 of the steering gear assembly 103 in such a way that the rack shaft 31 can slide in the vehicle width direction, which is perpendicular to the plane of the drawing sheet of FIG. 2. Ball joint sockets (not shown) are attached to both ends of the rack shaft 31 with respect to the vehicle width direction respectively by screwing, and tie rods 104, 104 (see FIG. 1) coupled to the ball joint sockets are connected to wheels via knuckle arms (not shown).

The pinion shaft 107 has a pinion 41 provided in the portion near the lower end. A shaft portion 42 of the pinion shaft 107 above the pinion 41 is rotatably supported on the housing 21 via a ball bearing 51, which serves as the first bearing. The ball bearing 51 bears the radial load and the thrust load acting on the pinion shaft 107. The shaft portion 42 has a diameter smaller than the pinion 41 and is adjacent to the pinion 41 with respect to the vertical direction with a shoulder 44 between them. The portion of the pinion shaft 107 above the shaft portion 42 is provided with a groove 43 extending along its circumference. A ring 52 is fixedly attached to the groove 43 by caulking. The ring 52 and the shoulder 44 of the pinion shaft 107 hold the inner ring of the ball bearing 51 between them from above and below.

The outer ring of the ball bearing 51 is internally fitted in a cylindrical bore 22 provided in the housing 21. The portion of the inner circumferential surface of the cylindrical bore 22 above the ball bearing 51 is provided with an annular groove 23. A tapered snap ring 53 serving as a retaining ring is fitted in the annular groove 23. As shown in FIG. 3, the tapered snap ring 53 has a C-shaped part 532 and an opening 531 defined by two opposed ends of the C-shaped part 532. The upper end face of the outer ring of the ball bearing 51 is pressed downward in the axial direction by the C-shaped part 532 of the tapered snap ring 53, so that the outer ring of the ball bearing 51 is fixed to the housing 21. The tapered snap ring 53 is fitted in the annular groove 23 with the C-shaped part 532 being elastically compressed with respect to radial directions. Consequently, a force biasing the tapered snap ring 53 in radially extending directions is always acting on the tapered snap ring 53 in the state in which it is fitted in the annular groove 23. The tapered snap ring 53 and the annular groove 23 each has at upper side a tapered surface that tapers in such a way that it becomes closer to the ball bearing 51 as it runs radially outward. With the above-described construction, as the tapered snap ring 53 is fitted into the annular groove 23, the tapered snap ring 53 expands in radial directions and presses the outer ring of the ball bearing 51 downward with respect to the axial direction by a wedge effect. In consequence, the gap between the outer ring of the ball bearing 51 and the tapered snap ring 53 and the gap between the outer ring of the ball bearing 51 and the bottom of the cylindrical bore 22 of the housing 21 are eliminated, and the outer ring of the ball bearing 51 is fixed between the tapered snap ring 53 and the bottom of the cylindrical bore 22 of the housing 21.

The shaft portion 45 of the pinion shaft 107 below the pinion 41 is rotatably supported on the housing 21 via a needle bearing 54, which serves as a second bearing. The needle bearing 54 bears only radial load acting on the pinion shaft 107. The rotation of the pinion shaft 107 is transmitted to the rack teeth 32 of the rack shaft 31 via the pinion 41 to change the orientation of the steer wheels via the tie rods 104, 104 shown in FIG. 1 coupled to the rack shaft 31.

The housing 21 is provided with a guide bore 24 having a circular cross section and extending in the horizontal direction in FIG. 2 or the substantially front-rear direction with respect to the vehicle body. A cylindrical rack guide 61 is internally fitted in the guide bore 24 in such a way that the rack guide 61 can slide in the horizontal direction in FIG. 2. The rack guide 61 is provided with a concave cylindrical surface 62 having a curvature substantially equal to the curvature of a convex cylindrical outer circumferential surface 33 of the rack shaft 31. The concave cylindrical surface 62 is in contact with the outer circumferential surface 33 of the rack shaft 31 to press the rack guide 61 against the outer circumference 33 of the rack shaft 31.

An adjust cover 63 is screwed to the right end of the guide bore 24. A coil spring 64 is provided between the adjust cover 63 and the rack guide 61. The adjust cover 63 is turned to appropriately adjust the distance over which it is screwed into the guide bore 24, thereby pressing the rack guide 61 toward the rack shaft 31 via the coil spring 64 and pressing the rack guide 61 against the outer circumference 33 of the rack shaft 31. Thus, backlash in the engagement of the pinion 41 and the rack shaft 31 is eliminated to allow smooth movement of the rack shaft 31.

A cylindrical fitting portion 711 at the lower end of a hollow cylindrical cover 71 is press-fitted to the cylindrical bore 22 provided in the housing 21. The bottom end face 713 of a flange 712 provided on the upper portion of the cylindrical fitting portion 711 abuts the top end face 25 of the housing 21 to position the cover 71 relative to the housing 21 with respect to the vertical direction.

The cover 71 extends upward to cover the upper part of the pinion shaft 107. A rubber gasket 72 fixedly attached to the upper end of the cover 71 abuts the toe board 73 of the vehicle body to prevent the upward displacement of the cover 71. The gasket 72 absorbs the displacement of the housing 21 caused by vibration during the running of the vehicle to reduce the impact and prevents dust and foreign matters from entering into the gap between the housing 21 and the pinion shaft 107.

As the pinion 41 turns in the clockwise direction as seen from one axial direction of the pinion shaft 107 as indicated by arrow 411 in FIG. 4, the tooth surface of the pinion 41 presses a rack tooth 32 in a certain direction in the engaging portion of the rack tooth 32 and the pinion 41. The pressing force exerted on the rack tooth 32 by the tooth surface of the pinion 41 acts in the direction D1 of the common normal line V1 of the tooth surface of the pinion 41 and the rack tooth 32. The common normal line V1 is inclined relative to the pitch line 321 of the rack teeth 32 by an angle equal to the pressure angle $\alpha$ of the rack teeth 32. In this state, a load acts on the tooth surface of the pinion 41 in the direction opposite to arrow D1. This load acts along the common normal line V1 of the tooth surfaces in the engaging portion. With this load, a load F1 in the direction opposite to arrow D1 acts on the pinion 41 as a whole, as shown in FIG. 4.

On the other hand, as the pinion 41 turns in the anticlockwise direction as seen from one axial direction of the pinion shaft 107 as indicated by arrow 412 in FIG. 5, the tooth surface of the pinion 41 presses a rack tooth 32 in a certain direction in the engaging portion of the rack tooth 32 and the pinion 41. The pressing force exerted on the rack tooth 32 by the tooth surface of the pinion 41 acts in the direction D2 of the common normal line V2 of the tooth surface of the pinion 41 and the rack tooth 32. The common normal line V2 is inclined relative to the pitch line 321 of the rack teeth 32 by an angle equal to the pressure angle $\alpha$ of the rack teeth 32. In this state, a load acts on the tooth surface of the pinion 41 in the direction opposite to arrow D2. This load acts along the common normal line V2 of the tooth surfaces in the engaging portion. With this load, a load F2 in the direction opposite to arrow D2 acts on the pinion 41 as a whole, as shown in FIG. 5.

As above, the direction of the load acting on the tooth surface in the engaging portion of the pinion 41 changes depending on the turning direction of the pinion 41. In other words, the direction of the load acting on the pinion as a whole changes between the direction of the above-described load F1 or the direction of the above-described load F2 depending on the turning direction of the pinion 41. As shown in FIG. 3, a first center axis 47 is defined as a straight line passing the center 46 of the pinion 41 and parallel to the axial direction of the rack shaft 31 as seen from one axial direction of the pinion shaft 107. Then, the directions of the load F1 and F2 are oriented as follows. The direction of the load F1 is inclined from the center axis 47 away from the rack shaft 31 on one side of the center 46 of the pinion 41 with respect to the vehicle width direction, e.g. on the upper side in FIG. 3, by angle $\alpha$ about the center 46 of the pinion 41. On the other hand, the direction of the load F2 is inclined from the center axis 47 away from the rack shaft 31 on the other side of the center 46 of the pinion 41 with respect to the vehicle width direction, e.g. on the lower side in FIG. 3, by angle $\alpha$ about the center 46 of the pinion 41.

With the load F1, F2, a bending load that tends to bend the pinion 41 away from the rack shaft 31 acts on the pinion shaft 107, and a bending moment M acts on the ball bearing 51 and the tapered snap ring 53 in a substantially upward direction as shown in FIG. 2. In other words, a large moment M acts on the portion of the ball bearing 51 and the tapered snap ring 53 on the side opposite to the rack shaft 31 as seen from one axial direction of the pinion shaft 107. On the other hand, the effect of the bending moment M on the portion of the ball bearing 51 and the tapered snap ring 53 near the rack shaft 31 is small. This bending moment M inclines the ball bearing 51 and the tapered snap ring 53 relative to the center axis of the pinion shaft 107. The rigidity of the tapered snap ring 53 is lowest in the portion near the opening 531 and highest in the portion of the C-shaped part 532 that is located at the position opposite to the opening 531, namely at the position having a angle difference of 180 degrees from the opening 531.

As shown in FIG. 3, the opening 531 of the tapered snap ring 53 is fitted to the annular groove 23 at an angle minimizing the effect of the moment M generated by the load F1, F2. Specifically, the tapered snap ring 53 is fitted to the annular groove 23 in such a way that the opening 531 is located on the rack shaft 31 side of the first center axis 47 and on a second center axis 48 passing the center 46 of the pinion 41 and perpendicular to the center axis 47 as seen from one axial direction of the pinion shaft.

In the embodiment of the present invention, as shown in FIG. 3, the angle $\theta$ or the angle formed by the center axis 47 and the line passing the center of the opening 531 of the tapered snap ring 53 and the center 46 of the pinion 41 is set to 90 degrees. Specifically, the opening 531 is located at a position inclined from the first center axis 47 toward the rack shaft 31 by 90 degrees about the center 46 of the pinion 41, as seen from one axial direction of the pinion shaft 107. Setting the angle $\theta$ of the opening 531 relative to the center axis 47 to 90 degrees is preferable because the influence of the load F1, F2 on the moment M of the tapered snap ring 53 is minimized. The angle $\theta$ of the opening 531 relative to the center axis 47 is not limited to 90 degrees, but it may be set in such a way as to be in a range of angle $\beta$ shown in FIG. 3 or the range expressed by $\alpha<\theta<(180 \text{ degrees}-\alpha)$. More specifically, as seen from one axial direction of the pinion shaft 107, let the angle of the direction of the first center axis 47 on one side of the vehicle width direction with respect to the center 46 of the pinion 41 be referred to as 0 degree, let the angle inclined from the direction of 0 degree toward the rack shaft 31 by 90 degrees be referred to as 90 degrees, and let the angle of the direction of the first center axis 47 on the other side of the vehicle width direction be referred to as 180 degrees, then, the range of angle $\beta$ or the range of $\theta$ is the angle range that is closer to the rack shaft 31 among the angle ranges delimited by the direction inclined from the direction of 0 degree by angle $\alpha$ toward the rack shaft 31 and the direction inclined from the direction of 180 degrees by angle $\alpha$ toward the rack shaft 31. In other words, the range of $\theta$ is the angle range that is on the rack shaft 31 side among the angle ranges delimited by the two directions that are inclined respectively from one and the other directions of the first center axis 47 by angle $\alpha$ about the center 46 of the pinion 41 toward the rack shaft 31.

With the above-described arrangement, even when a large moment M is exerted on the tapered snap ring 53 by a load F1, F2 acting on the pinion shaft 107 from wheels via the rack shaft 31 during running or by a load applied to the pinion shaft 107 during steering, tilting of the tapered snap ring 53 relative to the pinion shaft 107 and displacement of the pinion shaft 107 in the axial direction can be prevented from occurring. In consequence, the position of engagement of the pinion 41 and the rack teeth 32 can be maintained at an appropriate position, and therefore generation of abnormal noise and variation in the steering force can be prevented. In the embodiment of the present invention, what is required is only setting the angle at which the tapered snap ring 53 is fitted to the annular groove 23 to an appropriate angle. Therefore, increase in the manufacturing cost can be prevented.

While in the above-described embodiment, an exemplary case in which the present invention is applied to a tapered snap ring having an inclined surface on the top face has been described, the present invention may be applied to an ordinary snap ring having a flat top face. Furthermore, while in the above-described embodiment, an exemplary case in which the present invention is applied to a column-assist, rack-and-pinion type power steering apparatus has been described, the present invention may be applied to a pinion-assist, rack-and-pinion type power steering apparatus or a rack-and-pinion type manual steering apparatus.

The invention claimed is:

1. A steering apparatus for a vehicle comprising:
a housing;
a rack shaft that is supported on said housing in such a way as to be able to move back and forth and changes a turning angle of wheels via tie rods;
a pinion shaft that is linked with a steering wheel, has a pinion engaging with rack teeth of said rack shaft, and transmits rotation of the steering wheel to said rack shaft;
a cover extending upwardly from the housing to cover an upper part of the pinion shaft;
a gasket fixedly attached to an upper end of the cover to prevent the upward displacement of the cover, wherein the gasket absorbs displacement of the housing caused by vibration during running of the vehicle to reduce impacts;
a first bearing that is internally fitted to said housing, rotatably supports one end of said pinion shaft on the housing, and bears a radial load and a thrust load acting on said pinion shaft;
a second bearing that is internally fitted to said housing, rotatably supports the other end of said pinion shaft on the housing, and bears a radial load acting on said pinion shaft; and
a retaining ring that is internally fitted to an annular groove provided on an inner circumferential surface of said housing and has a C-shaped part and an opening defined by two opposed ends of the C-shaped part, said C-shaped part being in contact with an end face of an outer ring of said first bearing to thereby fix the outer ring of the first bearing to said housing,
wherein said retaining ring is internally fitted to the annular groove of said housing in such a way that said opening is located on a side of said rack shaft with respect to said pinion shaft as seen from an axial direction of said pinion shaft, and
wherein the following relationship is satisfied:

$\alpha < \theta < 180° - \alpha$ where $\theta$ denotes an angle defined by a line that connects a center of said opening and the center of the pinion and by a center axis that is parallel to the axis of said rack shaft and passes through the center of the pinion, and $\alpha$ denotes a pressure angle of said rack teeth.

2. A steering apparatus according to claim 1, wherein said angle $\theta$ is 90 degrees.

3. A steering apparatus according to claim 1, wherein said first bearing is a ball bearing, and said second bearing is a needle bearing.

4. A steering apparatus according to claim 1, wherein said retaining ring is a tapered snap ring formed with a tapered surface at an opposite side to a side at which said first bearing is in contact with the tapered snap ring, the tapered surface tapering in such a way that the tapered surface becomes closer to the first bearing.

5. A steering apparatus according to claim 1, further comprising a steering column in which a steering shaft is rotatably supported, the steering shaft being connected with said steering wheel at an end and with the pinion shaft through an intermediate shaft at an opposite end, and an electric motor attached to the steering column for applying a steering assist force to the steering shaft.

6. A steering apparatus comprising:
a housing;
a rack shaft that is supported on said housing in such a way as to be able to move back and forth and changes a turning angle of wheels via tie rods;
a pinion shaft that is linked with a steering wheel, has a pinion engaging with rack teeth of said rack shaft, and transmits rotation of the steering wheel to said rack shaft;
a cover extending upwardly from the housing to cover an upper part of the pinion shaft;
a gasket fixedly attached to an upper end of the cover to prevent the upward displacement of the cover, wherein the gasket absorbs displacement of the housing caused by vibration during running of the vehicle to reduce impacts;
a first bearing that is internally fitted to said housing, rotatably supports one end of said pinion shaft on the housing, and bears a radial load and a thrust load acting on said pinion shaft;
a second bearing that is internally fitted to said housing, rotatably supports the other end of said pinion shaft on the housing, and bears a radial load acting on said pinion shaft; and
a retaining ring that is internally fitted to an annular groove provided on an inner circumferential surface of said housing and has a C-shaped part and an opening defined by two opposed ends of the C-shaped part, said C-shaped part being in contact with an end face of an outer ring of said first bearing to thereby fix the outer ring of the first bearing to said housing,
wherein said retaining ring is internally fitted to the annular groove of said housing in such a way that said opening is located at a side of said rack shaft with respect to the pinion shaft as seen from an axial direction of said pinion shaft, and
wherein as seen from the axial direction of said pinion shaft, let $\theta$ be an angle of a center line of said opening relative to a center axis that is parallel to the axis of said rack shaft and passes through the center of said pinion, and let $\alpha$ be a pressure angle of said rack teeth; then said angle $\theta$ is within an angle range $\beta$ that is on the rack shaft side delimited by two lines that are inclined respectively in one and another directions from said center axis by angle $\alpha$ about the center of the pinion toward the rack shaft.

* * * * *